(12) United States Patent
Fernandes et al.

(10) Patent No.: US 9,854,074 B2
(45) Date of Patent: Dec. 26, 2017

(54) CASE FOR ELECTRONIC DEVICES

(71) Applicant: I-BLADES, INC., Milpitas, CA (US)

(72) Inventors: Jorge M. Fernandes, Danville, CA (US); Paul Meissner, San Jose, CA (US); Nick Osborne, Los Altos Hills, CA (US)

(73) Assignee: I-BLADES, INC., Milpitas, CA (US)

( * ) Notice: Subject to any disclaimer, the term of this patent is extended or adjusted under 35 U.S.C. 154(b) by 0 days.

(21) Appl. No.: 15/245,027

(22) Filed: Aug. 23, 2016

(65) Prior Publication Data

US 2017/0085687 A1    Mar. 23, 2017

Related U.S. Application Data

(63) Continuation-in-part of application No. 29/537,295, filed on Aug. 24, 2015.

(60) Provisional application No. 62/209,287, filed on Aug. 24, 2015.

(51) Int. Cl.
| | |
|---|---|
| *H04M 1/00* | (2006.01) |
| *H04M 1/02* | (2006.01) |
| *A45C 11/00* | (2006.01) |
| *A45F 5/00* | (2006.01) |
| *H04M 1/03* | (2006.01) |
| *H04B 1/3888* | (2015.01) |

(52) U.S. Cl.
CPC ........... *H04M 1/0254* (2013.01); *A45C 11/00* (2013.01); *A45F 5/00* (2013.01); *H04B 1/3888* (2013.01); *H04M 1/0274* (2013.01); *H04M 1/0277* (2013.01); *H04M 1/035* (2013.01); *A45C 2011/002* (2013.01)

(58) Field of Classification Search
CPC ............. H04M 1/0254; H04M 1/0274; H04M 1/0277; H04M 1/035; H04B 1/3888
USPC ........................................................ 455/575.8
See application file for complete search history.

(56) References Cited

U.S. PATENT DOCUMENTS

| | | | |
|---|---|---|---|
| D603,603 S | 11/2009 | Laine et al. | |
| D622,716 S | 8/2010 | Andre et al. | |
| 8,442,604 B1* | 5/2013 | Diebel | G03B 17/02 361/679.32 |
| 8,457,701 B2* | 6/2013 | Diebel | H04B 1/3888 206/701 |
| D709,439 S | 7/2014 | Ferber et al. | |
| 2009/0186264 A1* | 7/2009 | Huang | H01M 2/1022 429/96 |
| 2013/0231165 A1* | 9/2013 | Griffin | H04M 1/0283 455/575.8 |

(Continued)

OTHER PUBLICATIONS

U.S. Appl. No. 29/537,295, "Restriction Requirement", dated Sep. 30, 2016, 6 pages.

(Continued)

*Primary Examiner* — April G Gonzales
(74) *Attorney, Agent, or Firm* — Kilpatrick Townsend & Stockton LLP

(57) ABSTRACT

An external device for an electronic device includes a first cover portion configured to cover at least a portion of the electronic device, an insert coupled to the first cover portion, and a second cover portion coupled to the insert and covering at least a portion of the insert. At least an outer layer of the first cover portion or the second cover portion is made of a non-moldable material. The insert includes various mechanical structures and electrical circuits.

20 Claims, 13 Drawing Sheets

(56) References Cited

U.S. PATENT DOCUMENTS

| | | | | |
|---|---|---|---|---|
| 2014/0224675 A1* | 8/2014 | Simmer | ................. | A45C 11/00 |
| | | | | 206/37 |
| 2014/0228082 A1* | 8/2014 | Morrow | ............... | H04B 1/3888 |
| | | | | 455/575.8 |
| 2014/0274232 A1* | 9/2014 | Tages | ................... | H04B 1/3888 |
| | | | | 455/575.8 |
| 2015/0229754 A1* | 8/2015 | Won | ........................ | G06F 1/165 |
| | | | | 455/575.8 |
| 2015/0318888 A1* | 11/2015 | Zhang | .................... | A45C 11/00 |
| | | | | 455/575.8 |
| 2015/0365124 A1* | 12/2015 | Choi | ................... | H04B 1/3888 |
| | | | | 455/575.8 |
| 2016/0080023 A1* | 3/2016 | Ou Yang | ............... | H04B 1/3888 |
| | | | | 455/575.8 |

OTHER PUBLICATIONS

U.S. Appl. No. 29/537,295, "Notice of Allowance", dated Jan. 20, 2017, 5 pages.

\* cited by examiner

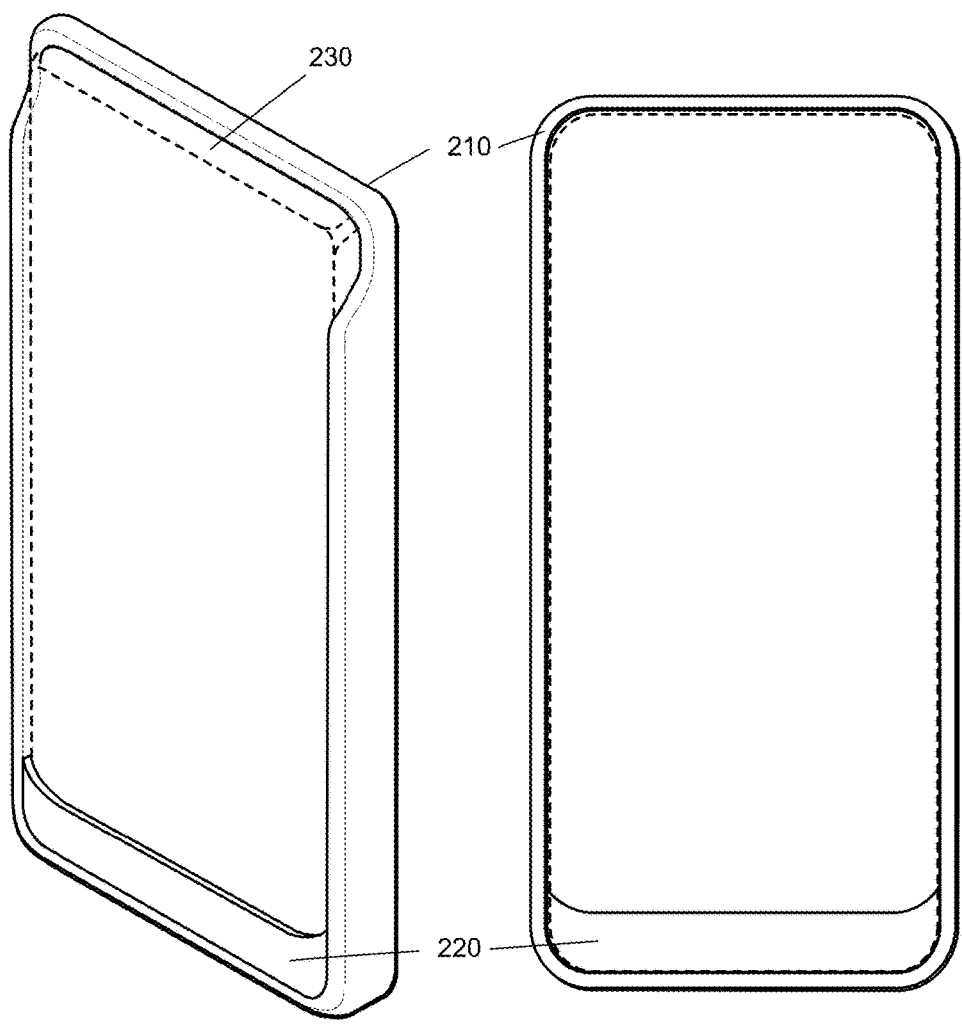
FIG. 2A                    FIG. 2B

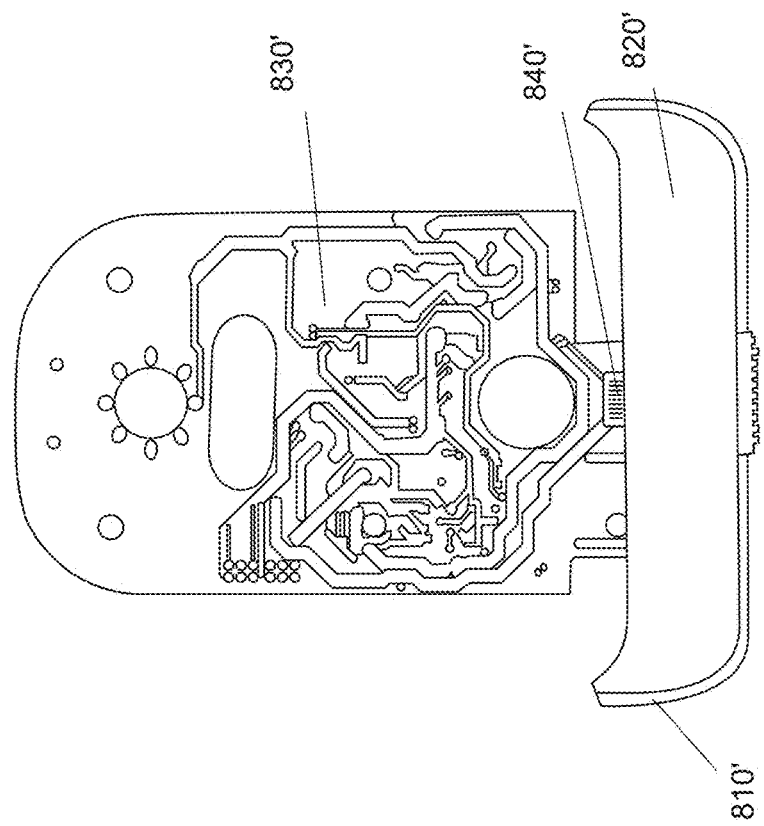
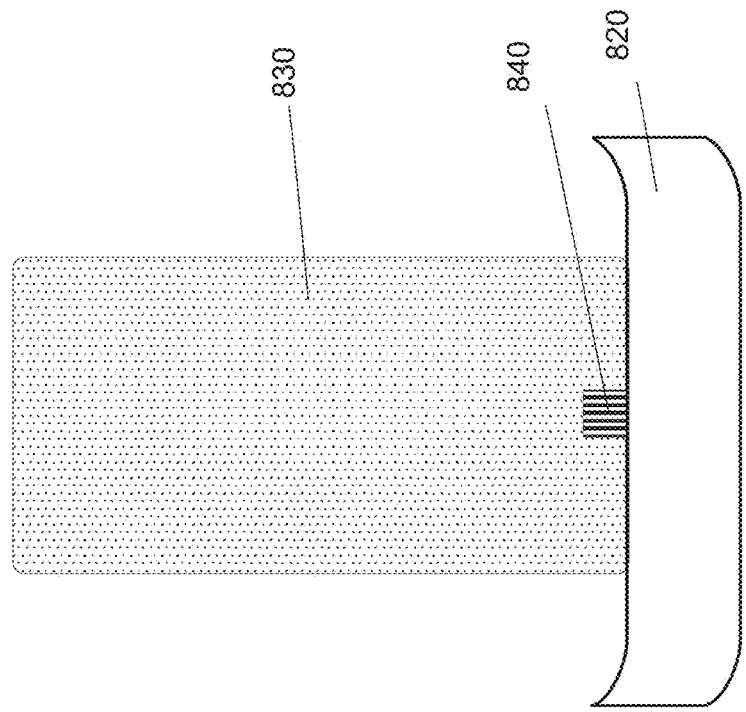

CASE FOR ELECTRONIC DEVICES

CROSS-REFERENCES TO RELATED APPLICATIONS

This application claims priority to U.S. Provisional Patent Application No. 62/209,287, filed Aug. 24, 2015, entitled "Case for Electronic Devices." This application is also a continuation-in-part of U.S. Design Patent Application No. 29/537,295, filed Aug. 24, 2015, entitled "Case for an Electronic Device", the disclosures of which are hereby incorporated by reference in their entirety for all purposes.

BACKGROUND

An external device, such as an external case, may be used with an electronic device to personalize the electronic device and provide improved shock resistance, protection, and functions to the electronic device. For example, in some cases, it may be desirable to include additional connectors, adaptors or convertors in the external case for connecting additional devices in or outside the external device to the electronic device. Leather, fabric, or other non-moldable material may be used to cover the external device to improve the feel and appearance of the external device. However, making an overlay cover for the external device using materials that are not suitable for molding or three-dimensional (3-D) printing may be difficult, and may create undesirable features, such as wrinkles at corners (especially round corners), that could affect the feel and appearance of the external device.

SUMMARY OF THE INVENTION

Embodiments of the present invention relate generally to an external device for an electronic device. More specifically, embodiments of the present invention provide cases for protecting a mobile device, personalizing the mobile device, and extending the functions and capacities of the mobile device.

Embodiments of the present invention improve the function, appearance, and manufacturability of cases for electronic devices, such as mobile devices. As described herein, the external device may be in the form of a case with multiple portions, where at least an outer layer of some of the multiple portions is made with a material such as a leather or a fabric, which may be appealing to many users, but may be difficult to fabricate using injection molding or 3-D printing methods. The external device may also include an insert that includes one or more connectors, adaptors or convertors and is configured to connect to the electronic device to extend functions and capacities of the electronic device. One of ordinary skill in the art would recognize many variations, modifications, and alternatives.

According to an embodiment of the present invention, an external device for an electronic device, such as a mobile device, is provided. The external device includes a first cover portion configured to cover at least a portion of the electronic device, an insert coupled to the first cover portion, and a second cover portion coupled to the insert and covering at least a portion of the insert, where at least one of an outer layer of the first cover portion or an outer layer of the second cover portion is made with a non-moldable material. In some embodiments, the non-moldable material includes at least one of a leather, fabric, silk, faux leather, artificial leather, or vinyl. In some embodiments, the insert and the second cover portion of the external device for the electronic device are disposed at a bottom portion of the first cover portion.

According to some embodiments of the present invention, the insert of the external device for the electronic device includes a curved waveguide for conducting sound waves. In some embodiments, the curved waveguide is tapered from one end to another end, such as in a form of a trumpet. In some embodiments, the second cover portion includes a plurality of perforations aligned with one end of the curved waveguide. In some embodiments, the curved waveguide includes a 90-degree curve. In some embodiments, the curved waveguide includes a plurality of waveguides.

According to some embodiments of the present invention, the insert of the external device for the electronic device includes one or more mechanical structures for housing one or more electrical connectors. In some embodiments, the insert includes a moldable material. In some embodiments, the insert is detachably coupled to the first cover portion.

According to some embodiments of the present invention, the external device for the electronic device further includes an electrical circuit coupled to the insert. In some embodiments, the electrical circuit includes or is configured to connect to at least one of a connector, an adaptor, a memory device, or a battery.

According to various embodiments of the present invention, the insert of the external device may include at least one electrical connector configured to connect to the electronic device. In some embodiments, the insert includes an electronic component, such as a circuit board, a battery, or a memory.

According to some embodiments of the present invention, the first cover portion of the external device also includes an electronic component, wherein the electronic component of the first cover portion is in electrical communication with the insert.

According to another embodiment of the present invention, an assembly for use in an external case for an electronic device is provide. The assembly includes an insert including a curved waveguide for conducting sound waves to the electronic device and a cover covering at least a portion of the insert, where the cover includes one or more apertures aligned with one end of the curve waveguide on the insert. In some embodiments, the cover includes a non-moldable material. In some embodiments, the non-moldable material includes at least one of leather, fabric, silk, faux leather, artificial leather, or vinyl. In some embodiments, the assembly further includes an electric circuit coupled to the insert. In some embodiments, the electrical circuit includes a flexible print circuit board. In some embodiments, the insert is configured to be detachably coupled to the external case.

Many benefits can be achieved by way of the present invention over conventional techniques. For example, the leather or fabric material may improve the touch, feel, and appearance of the external device. The configuration of the external device disclosed herein can improve the manufacturability of the external device without forming overlapping material at corners. The external device disclosed herein can also improve sound quality and power efficiency of the combined system of the mobile device and the external device, thus improving overall user experience.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present disclosure are described in detail below with reference to the following drawing figures.

FIG. 2A is a perspective view of an example external device in the form of a mobile device case, according to certain aspects of the present disclosure.

FIG. 2B is a front view of an example external device in the form of a mobile device case, according to certain aspects of the present disclosure.

FIG. 8A is a front view of an example insert portion of an external device where the insert portion is coupled with an electrical circuit, according to certain aspects of the present disclosure.

FIG. 8B depicts an example insert portion of an external device where the insert portion is coupled with an electrical circuit, according to certain aspects of the present disclosure.

DETAILED DESCRIPTION OF SPECIFIC EMBODIMENTS

Figure 1:
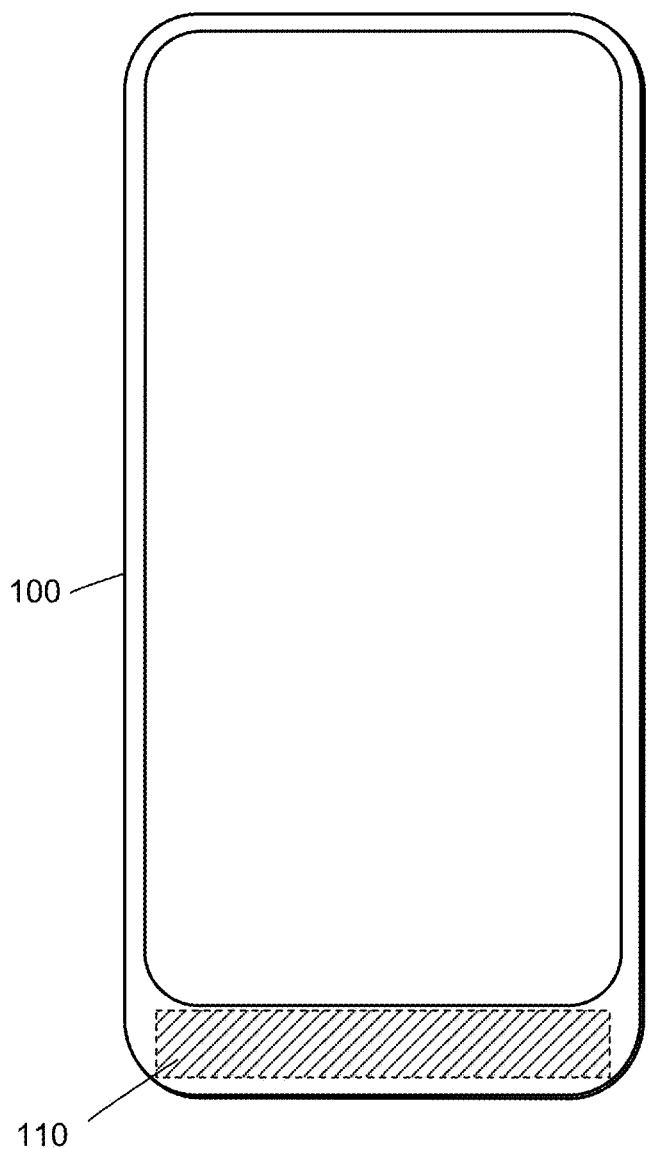
FIG. 1 illustrates an example external device for an electronic device, according to certain aspects of the present disclosure.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, structures, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Many users of mobile electronic devices use external devices or external cases to personalize their electronic devices; provide improved shock resistance and protection to the electronic devices; add additional battery, memory or other electronics; or add adaptors for various connections. External cases may be made with elastomeric/rubber materials, plastic materials, cut and sewn materials, or combinations thereof. For example, elastomeric/rubber or plastic cases may be made into a single piece by a 3-D printing or, more efficiently, a molding process, such as injection molding. A leather, fabric, or other non-moldable material can be used to cover the elastomeric/rubber or plastic cases to improve the feel and appearance of the external cases. However, covering the cases with a non-moldable material without creating undesired features, such as wrinkles at corners, may be challenging.

Techniques disclosed herein relate to external devices with improved appearance, manufacturability, and functionality for use with electronic devices, such as mobile devices. More specifically, an external device may include multiple portions that can be assembled by, for example, inserting one portion into another portion, where at least an outer layer of some of the multiple portions is made with materials such as a leather, a fabric, or other non-moldable materials, which are appealing to many users, but are difficult to fabricate using injection molding methods. At least one portion of the multiple portions, such as an insert portion, may be configured to connect to the electronic device through one or more connectors, adaptors or convertors to extend functions and capacities of the electronic device. The external device may also include other electrical or mechanical components for various functions.

FIG. 1 illustrates an external device 100 for an electronic device. External device 100 may be made with elastomeric/ rubber materials, plastic materials, cut and sewn materials, or any combinations thereof. For example, external device 100 may be made of a hard plastic material with an overlay cover of other materials, such as leather or fabric. In some embodiments, external device 100 may be a single-portion device made by, for example, a 3-D printing process or, more efficiently, a molding process, such as injection molding. In some embodiments, external device 100 may include multiple portions that can be assembled together chemically or mechanically to form one device. In many cases, an insert 110 may be included in external device 100 for various purposes, such as extending functions and capacities of the electronic device, for example, being used as an adaptor for connecting to various internal or external components of external device 100, the electronic device, an external battery, an external communication interface, or an external memory.

Insert 110 may be disposed within external device 100 at various locations, such as at the bottom or the top, and is preferably located at the bottom portion of external device 100. Insert 110 may be of various sizes, such as, for example, as long as a bottom portion of an electronic device being inserted into external device 100, and/or as wide as less than about 6 mm, about 6 to about 10 mm, or more than about 10 mm. Insert 110 may include many mechanical features formed thereon, and/or may include or be connected to various electrical circuits. Therefore, an enclosure may be desired at the bottom portion of external device 100 to cover insert 110 such that the details of the mechanical features and/or electrical circuits may not be seen from outside after an electronic device is inserted into external device 100. Because insert 110 is of certain width, the enclosure at the bottom portion of external device 100 may be at least as wide as the width of insert 110.

However, making an overlay cover for external device 100 with such an enclosure using materials that are not suitable for molding may be difficult, and may create wrinkles at corners, especially round corners, that could affect the feel and appearance of external device 100. For example, to cover the exterior of the bottom portion of external device 100 with a single piece of raw material, such as a leather or a fabric, the single piece of raw material may need to be wrapped along the edges and around the corners, and extra material may overlap at the corners or edges.

Figures 2C, 2D:
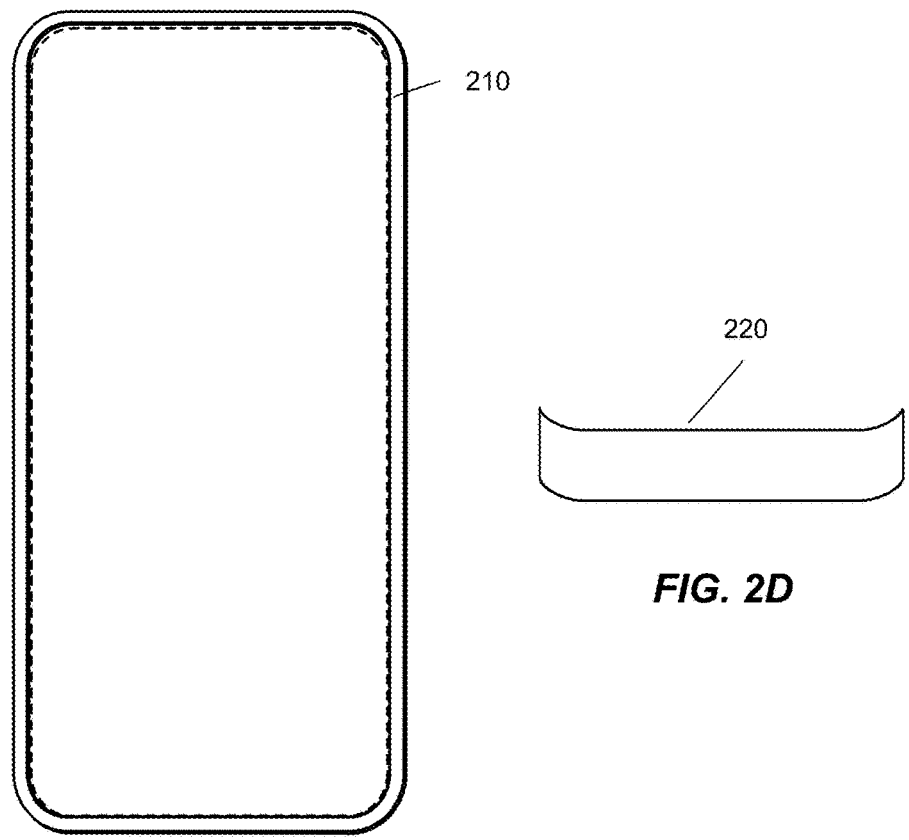
FIG. 2C illustrates an example portion of a multi-portion external device in the form of a mobile device case, according to certain aspects of the present disclosure.
FIG. 2D illustrates an example portion of a multi-portion external device in the form of a mobile device case, according to certain aspects of the present disclosure.

FIGS. 2A-2D illustrate an external device 200 that can avoid the manufacturability issue described above. FIG. 2A is a perspective view of an example external device in the form of a mobile device case, according to certain aspects of the present disclosure. FIG. 2B is a front view of an example external device in the form of a mobile device case, according to certain aspects of the present disclosure. As shown in FIGS. 2A and 2B, external device 200 may include a first (large) cover portion 210 that covers at least a portion of the back and four side edges of a mobile device 230 (shown by dashed lines), and a second (small) cover portion 220 that covers at least a bottom portion of the front of mobile device 230. First cover portion 210 and second cover portion 220 may include at least an outer layer covering at least some portions of first cover portion 210 and second cover portion 220. The outer layer may include any suitable natural or artificial materials, such as genuine leather, fabric, silk, faux leather, artificial leather, PVC, or vinyl.

FIG. 2C illustrates example first (large) cover portion 210 of the multi-portion external device in the form of a mobile device case, according to certain aspects of the present disclosure. FIG. 2D illustrates example second (small) cover portion 220 of the multi-portion external device in the form of a mobile device case, according to certain aspects of the present disclosure. First cover portion 210 and/or second cover portion 220 may include multiple layers. For example, first cover portion 210 and/or second cover portion 220 may include a hard plastic case and a leather overlay cover. In some embodiments, first cover portion 210 and second cover portion 220 may also include, for example, a cushion layer to improve shock resistance. In some embodiments, second cover portion 220 may include only one layer, such as a leather layer or a fabric layer, that wraps over an insert (not shown), such as insert 110 as described above with respect to FIG. 1.

In some embodiments, first cover portion 210 and second cover portion 220 may be detachable from each other. For example, an insert, such as insert 110 of FIG. 1, may be covered by second cover portion 220 and the electronic device may be attached to the insert. The insert may be positioned inside a portion of the second cover portion 210 and can provide a mechanism to hold the second cover portion 220 and the first cover portion in a fixed relationship to each other. For example, the insert may be held to first cover portion 210 by a friction or chemical force, and/or by mobile device 230 when mobile device 230 is inserted into external device 200. The insert may also be held to first cover portion 210 through other suitable means, such as a clip, a latch, a pressure component, a deformable component, or the like. One of ordinary skill in the art would recognize many variations, modifications, and alternatives.

In some other embodiments, first cover portion 210 and second cover portion 220 may not be detachable from each other by a user. For example, in various embodiments, first cover portion 210 and second cover portion 220 may be sewed together, glued together directly or indirectly through the insert as described above, or otherwise attached.

In some embodiments, first cover portion 210 may be a single piece. In some other embodiments, first cover portion 210 may include multiple parts coupled together. In some embodiments, the multiple parts may be detachable.

Figure 2E:
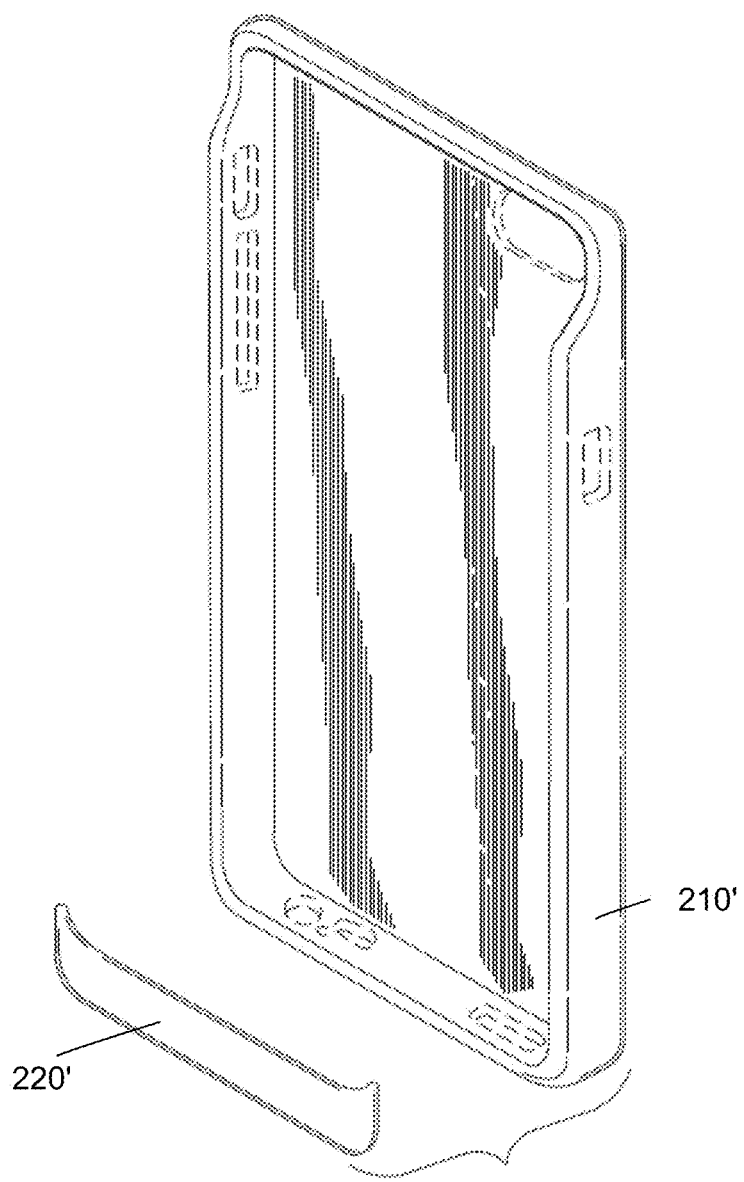
FIG. 2E is an exploded view of an example external device in the form of a mobile device case, according to certain aspects of the present disclosure.

FIG. 2E is an exploded view of an example external device 200' in the form of a mobile device case, according to certain aspects of the present disclosure. External device 200' may include a first (large or main) cover portion 210' and a second (small or secondary) cover portion 220'. As shown in FIG. 2E, first cover portion 210' may include various features formed thereon for allowing a user to access the electronic device held by first cover portion 210. The features may include, for example, cutout areas for the camera, volume control button, microphone, speaker, headphone plug, data/power connector (e.g., mini-universal serial bus (USB), micro-USB, USB type-C, Apple Lightning), extendable memory, or stylus of the electronic device. Second cover portion 220' may also include various features formed thereon as described in detail below.

Figure 3A:
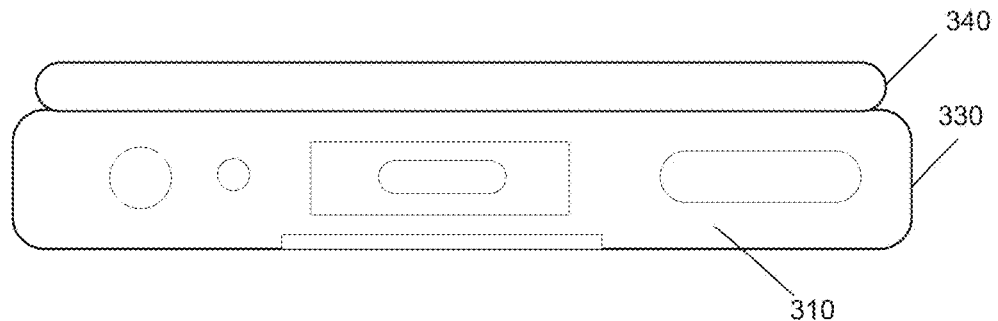
FIG. 3A illustrates an example insert portion of an external device for an electronic device, according to certain aspects of the present disclosure.

FIG. 3A illustrates an example insert portion 310 of an external device for an electronic device, according to certain aspects of the present disclosure. As shown in FIG. 3A, insert portion 310 may include various mechanical structures made of plastic, resin, or other nonconductive materials. The mechanical structures may be housings for different connectors, adaptors, convertors, or electronic components such as circuits, batteries, connectors, memory, or non-flexible or flexible circuit board. The mechanical structures, connectors, adaptors, or convertors may be arranged to change the locations of some connectors relative to locations of the connectors on a mobile device. The mechanical structures may include, for example, ports for accessing the microphone, speaker, headphone plug, data/power connector, extendable memory, or stylus of the electronic device. In some embodiments, the mechanical structures may also include a curved portion 330 that may facilitate fitting insert portion 310 into other portions of the external device, such as first cover portion 210 of FIGS. 2A-2D. In some embodiments, the mechanical structures may also include a curved portion 340 that may facilitate fitting a cover portion on insert portion 310 by, for example, the tension of the cover portion over curved portion 340 or an adhesive applied to curved portion 340. In some embodiments, insert portion 310 may include two or more elements coupled together.

Figure 3B:
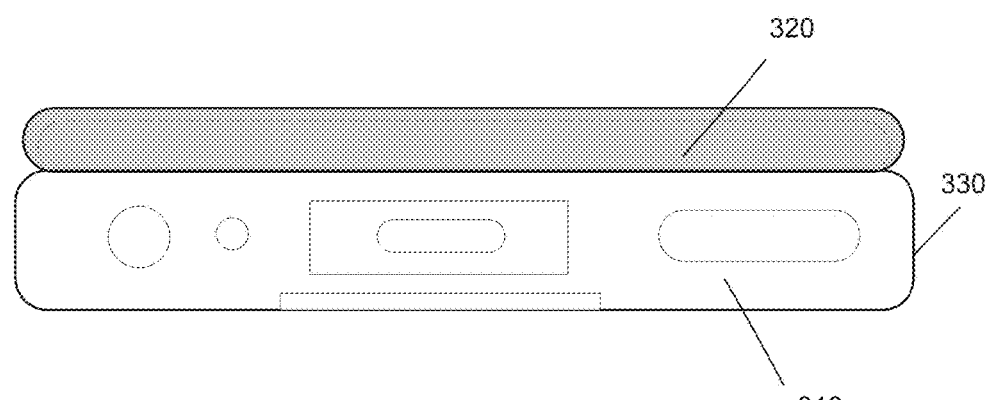
FIG. 3B illustrates an example insert portion of an external device for an electronic device, according to certain aspects of the present disclosure.

FIG. 3B illustrates example insert portion 310 of the external device for the electronic device according to certain aspects of the present disclosure, where a cover portion 320 (e.g., second cover portion 220 of FIGS. 2A-2D) covers at least a portion of insert portion 310. Cover portion 320 may wrap over a surface and at least some portions of edges of insert portion 310 (e.g., curved portion 340), and be held to insert portion 310 by a mechanical or chemical force, such as by the tension caused by curved portion 340 or by an adhesive (e.g., glue). Cover portion 320 may be made with any suitable natural or artificial materials, such as genuine leather, fabric, silk, faux leather, artificial leather, PVC, or vinyl.

Figure 3C:
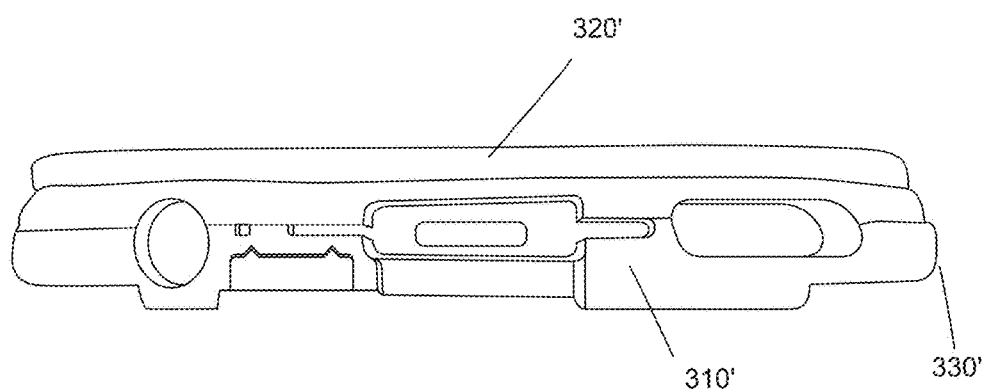
FIG. 3C illustrates an example insert portion of an external device for an electronic device, according to certain aspects of the present disclosure.

FIG. 3C illustrates an example insert portion 310' of an external device for an electronic device, according to certain aspects of the present disclosure. As shown in FIG. 3C, insert portion 310' may include various mechanical structures made of plastic, resin, or other nonconductive materials, as described above with respect to FIG. 3A. Insert portion 310' may also include a curved portion 330' that may facilitate fitting insert portion 310' into other portions of the external device, such as first cover portion 210 of FIGS. 2A-2D. At least a portion of insert portion 310' may be covered by a cover portion 320' made with materials such as genuine leather, fabric, silk, faux leather, artificial leather, PVC, or vinyl.

It is noted that the example insert portions shown in FIGS. 3A-3C are for illustration purpose only. Furthermore, FIGS. 4A-9B illustrate various embodiments and mechanical/electrical features of various portions of the external device. These figures are not intended to limit the various portions of the external device to the specific examples. It will be apparent that various embodiments may be practiced without some specific details or structures. One of ordinary skill in the art would recognize many variations, modifications, and alternatives.

Figure 4A:
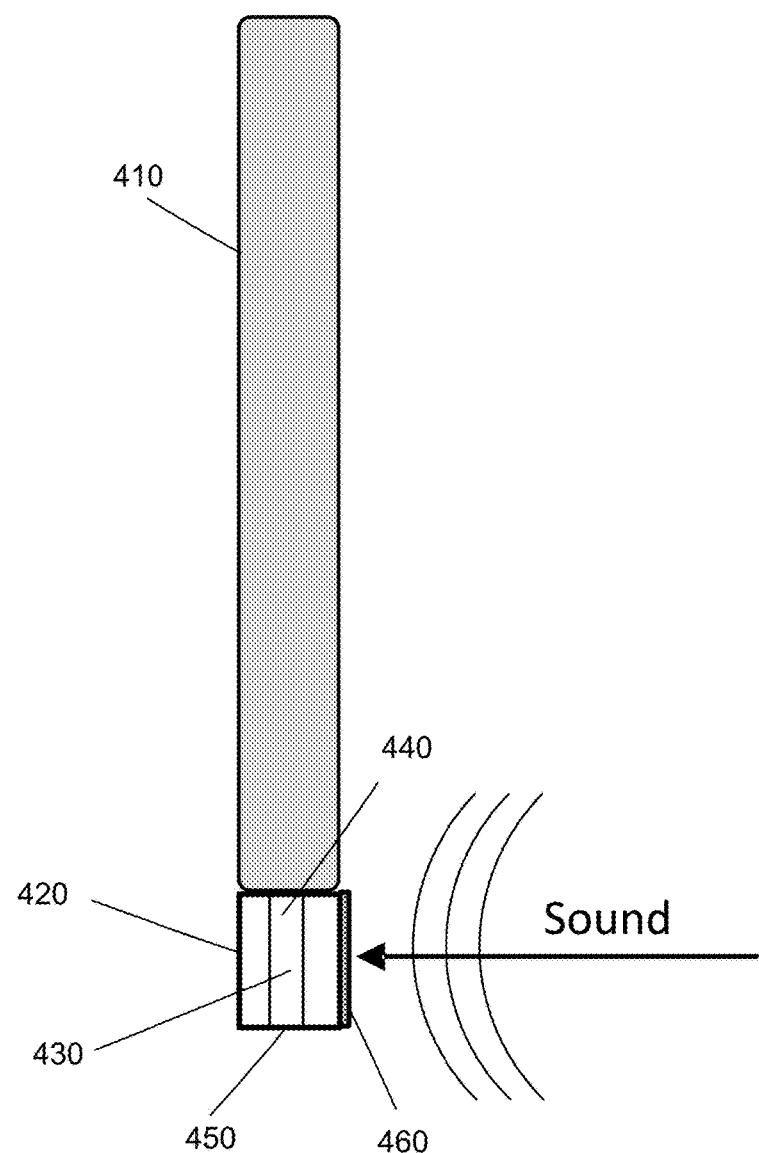
FIG. 4A illustrates an example insert in use with an electronic device, according to certain aspects of the present disclosure.

FIG. 4A illustrates an example insert 420 in use with an electronic device, such as a cell phone 410. As shown in FIG. 4A, insert 420 may be coupled to cell phone 410 at the bottom of cell phone 410, and at least the front surface of insert 420 may be covered with a small cover portion 460. Cell phone 410 may have, for example, microphone input(s) located at its bottom. Insert 420 may include at least one microphone hole 430 with a first opening 440 at a location such that, when insert 420 is coupled to cell phone 410, first opening 440 of microphone hole 430 may align with the microphone input(s) located at the bottom of cell phone 410. Thus, sound waves may propagate through microphone hole 430 to the microphone input(s) on cell phone 410.

In many cases, the microphone input(s) on cell phone 410 may be located near the mouth of a user during use. Thus, with a straight microphone hole built in insert 420 as shown in FIG. 4A where a second opening 450 of microphone hole 430 is located at the bottom, when insert 420 is coupled to cell phone 410 and thus extends the length of the combined system, some sound waves from a user may be incident on the front surface of insert 420 or an overlay cover of insert 420 (e.g., small cover portion 460), rather than the bottom of cell phone 410 or insert 420, as illustrated in FIG. 4A. As a result, a significant portion of sound waves from the user may not be able to reach the microphone input(s) of cell phone 410. This may affect the quality of the sound received at the microphone input(s) of cell phone 410, and/or increase power consumption of cell phone 410 as a higher gain of an amplifier of cell phone 410 may be needed.

Figure 4B:
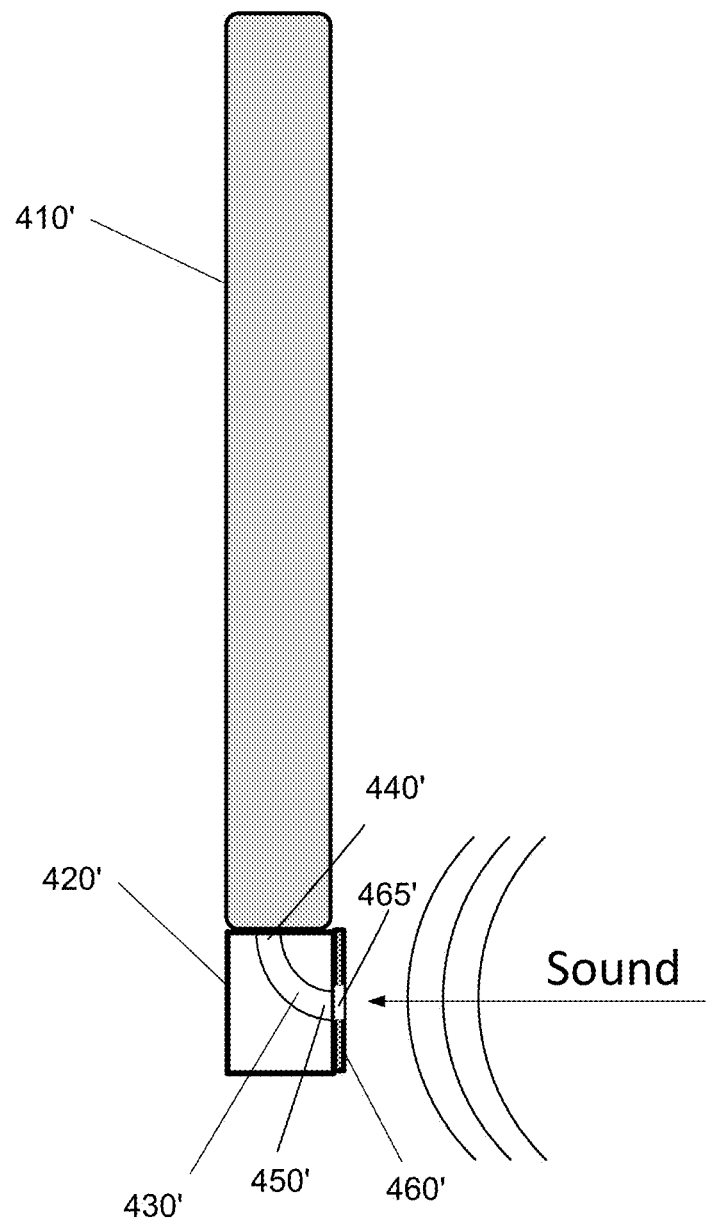
FIG. 4B illustrates an example insert in use with an electronic device, according to certain aspects of the present disclosure.

FIG. 4B illustrates another example insert 420' in use with an electronic device, such as cell phone 410'. Insert 420' may be coupled to cell phone 410' at the bottom of cell phone 410'. Cell phone 410' may have, for example, microphone input(s) located at its bottom. Insert 420' may include at least one microphone hole 430' with a first opening 440' at a location such that when insert 420' is coupled to cell phone 410', first opening 440' of microphone hole 430' may align with the microphone input(s) located at the bottom of cell phone 410'. Thus, sound waves may propagate through microphone hole 430' to the microphone input(s) on cell phone 410'. As shown in FIG. 4B, rather than having a second opening of microphone hole 430' at the bottom of insert 420', microphone hole 430' may include a waveguide with an about 90° curve such that a second opening 450' of microphone hole 430' may be located at the front surface of insert 420'. As a result, sound waves from a user may enter microphone hole 430' directly through second opening 450', and may be guided through microphone hole 430' towards the microphone input(s) at the bottom of cell phone 410', as shown in FIG. 4B. This configuration of the microphone hole 430' may significantly improve the quality of sound at the microphone input(s) of cell phone 410'. As shown in FIG. 4B, at least the front surface of insert 420' may be covered by a small cover portion 460', which may include an aperture 465' aligned with second opening 450' of microphone hole 430' on insert 420'.

In some embodiments, a large microphone hole 430 (or 430') may be built in insert 420 (or 420'). In some other embodiments, a plurality of small microphone holes 430 (or 430') may be built in insert 420 (or 420'). In some embodiments, the size of microphone hole 430 (or 430') may vary from first opening 440 (or 440') to second opening 450 (or 450'). For example, second opening 450 (or 450') may be larger than first opening 440 (or 440'), and microphone hole 430 (or 430') may gradually taper from second opening 450 (or 450') to first opening 440 (or 440') in a form of a trumpet, such that more sound waves may be collected.

In some embodiments, insert 420' may include a waveguide with an about 90° curve for the speaker output as well. The waveguide for the speaker output may be similar to the waveguide(s) for the microphone input as described above. The waveguides for the speaker output may be tapered from one end to the other end, such as in a form of a trumpet. Insert 420' may include one large waveguide or a plurality of small waveguides for the speaker output.

Figure 5A:
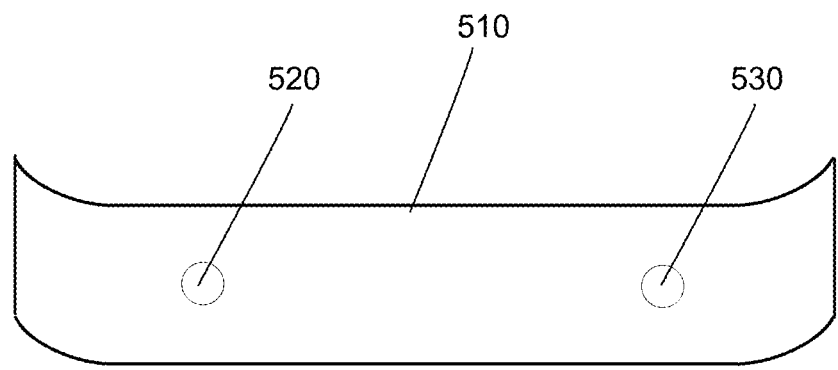
FIG. 5A illustrates an example cover for an insert of an external device for an electronic device, according to certain aspects of the present disclosure.

FIG. 5A illustrates an example cover portion 510 for an insert of an external device for an electronic device, such as small cover portion 460' for insert 420', according to certain aspects of the present disclosure. The external device may be a multi-portion external device for an electronic device, such as external device 200 of FIGS. 2A-2D. Cover portion 510 may cover at least the front surface of the insert, such as insert 420' of FIG. 4B. Cover portion 510 may include an aperture 520 for microphone input and an aperture 530 for speaker output. The locations and sizes of apertures 520 and 530 may vary as needed. Apertures 520 and 530 may be formed at locations corresponding to the waveguides for the microphone input and speaker outputs on the insert.

Figure 5B:
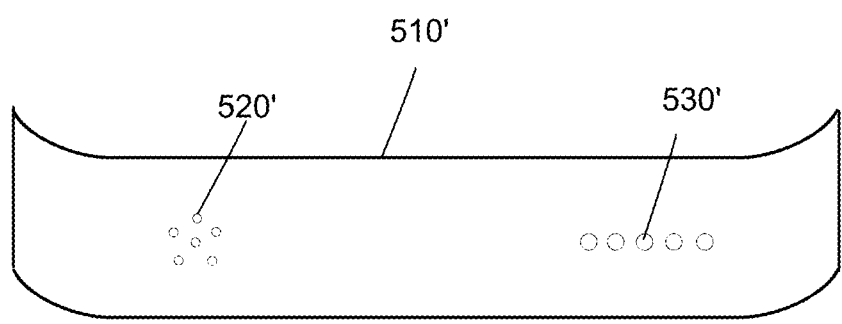
FIG. 5B illustrates an example cover for an insert of an external device for an electronic device, according to certain aspects of the present disclosure.

FIG. 5B illustrates an example cover portion 510' for an insert of an external device for an electronic device, such as small cover portion 460' for insert 420', according to certain aspects of the present disclosure. The external device may be a multi-portion external device for an electronic device, such as external device 200 of FIGS. 2A-2D. Cover portion 510' may cover at least the front surface of the insert, such as insert 420' of FIG. 4B. As shown in FIG. 5B, cover portion 510' may include a plurality of perforations 520' for the microphone input and a plurality of perforations 530' for the speaker output. The numbers, locations, configuration, and sizes of the plurality of perforations 520' and 530' may vary as desired. In some embodiments, the cover portion for the insert may include one aperture for the microphone input and a plurality of perforations for the speaker output. In some other embodiments, the cover portion for the insert may include a plurality of perforations for the microphone input and one aperture for the speaker output. The plurality of perforations 520' may be formed on cover portion 510' at a location corresponding to second opening 450' of microphone hole 430', such that sound waves may be more effectively collected and conducted by microphone hole 430'. Similarly, the plurality of perforations 530' may be formed on cover portion 510' at a location corresponding to an opening of the waveguide(s) for the speaker output.

Figure 6A:
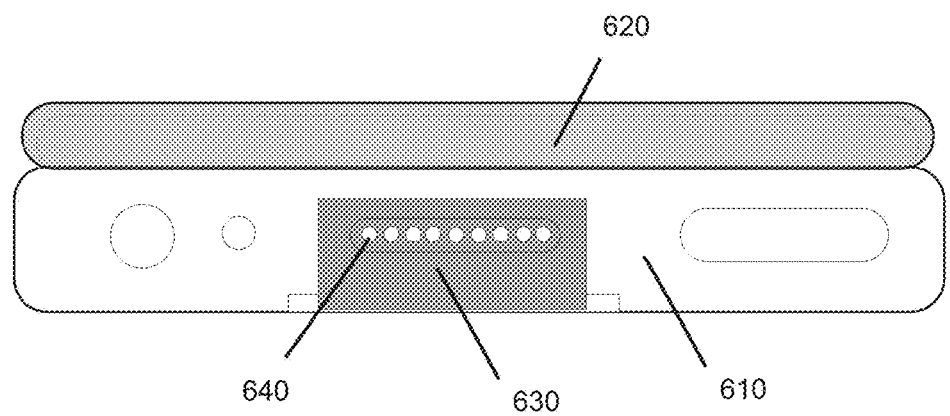
FIG. 6A is a bottom view of an example insert portion of an external device where the insert portion is coupled with an electrical circuit, according to certain aspects of the present disclosure.

FIG. 6A is a bottom view of an example insert portion 610 of an external device, where insert portion 610 is coupled with an electrical circuit 630, according to certain aspects of the present disclosure. A small cover portion 620 may cover the top surface and at least some parts of side edges of insert portion 610. Insert portion 610 may include various structures, such as holes or apertures for the microphone input, ear plug, power connector, or data communication port, as described above with respect to FIGS. 3A and 3B. Electrical circuit 630 may be built into insert portion 610 to form a removable assembly with insert portion 610 and small cover portion 620. The removable assembly may be detached from a large cover portion of the external device, such as first cover portion 210 shown in FIGS. 2A-2C, and/or may be replaced by a different assembly. In some embodiments, different assemblies may be made to fit in a same large cover portion, and may be made to be used in conjunction with different electronic devices and/or to include different structures and functions by, for example, coupling different electrical circuits to insert portion 610.

Electrical circuit 630 may include a flexible circuit board with a connector 640 that can be inserted into insert portion 610. The flexible circuit board may be bent over 90° such that a large portion of the flexible circuit board is in parallel with the top surfaces of insert portion 610 and small cover portion 620, and connector 640. Connector 640 may be any suitable connector, such as a lighting connector, a mini-USB connector, a micro-USB connector, or other modified USB connectors. Electronic components may be installed on the flexible circuit board, or otherwise connected electrically to the flexible circuit board. The electronic components may include battery, power management chips, charging circuits, antennas, memory, sensors, communication devices, security chips, or other functional blocks.

In some embodiments, electrical circuit 630 may be of different form factors, shapes or sizes. In some embodiments, electrical circuit 630 may be other forms of electrical circuits, such as a non-flexible printed circuit board (PCB) with electronic components built on it or connected to it. In some embodiments, electrical circuit 630 may be coupled to insert portion 610 in configurations different from the one shown in FIG. 6A.

Figure 6B:
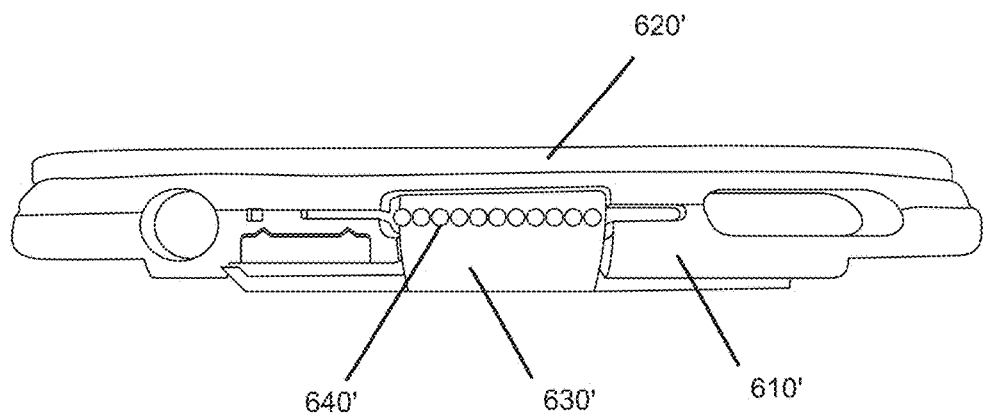
FIG. 6B depicts an example insert portion of an external device where the insert portion is coupled with an electrical circuit, according to certain aspects of the present disclosure.

FIG. 6B depicts an example insert portion 610' of an external device where insert portion 610' is coupled with an electrical circuit 630', according to certain aspects of the present disclosure. As shown in FIG. 6B, a small cover portion 620' may cover the top surface and at least some parts of side edges of insert portion 610'. Insert portion 610' may include various mechanical structures, and electrical circuit 630' may be coupled to insert portion 610' using one of the mechanical structures, such as a connector receptacle. Electrical circuit 630' may be connected to an electrical connector 640' through multiple connector pins. Electrical circuit 630' may include electronic components installed on a flexible print circuit board that can be bent to fit in openings or spaces in insert portion 610' or a large cover portion of the external device, such as first cover portion 210 of FIGS. 2A-2C. Electrical circuit 630', insert portion 610', and small cover portion 620' may form a removable assembly that can be attached to or detached from the large cover portion of the external device.

Figure 7A:
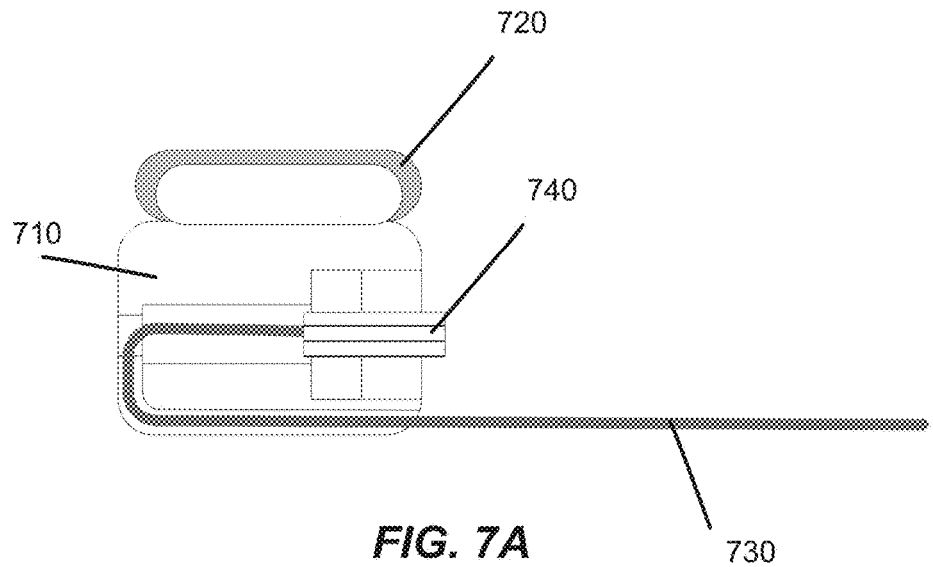
FIG. 7A is a cross-sectional view of an example insert portion of an external device where the insert portion is coupled with an electrical circuit, according to certain aspects of the present disclosure.

FIG. 7A is a cross-sectional view of an example insert portion 710 of an external device where insert portion 710 is coupled with an electrical circuit 730, according to certain aspects of the present disclosure. As described above with respect to FIG. 6A, a small cover portion 720 may cover the top surface and at least some parts of side edges of insert portion 710. Insert portion 710 may include various mechanical structures, and electrical circuit 730 may be coupled to insert portion 710 using one of the mechanical structures, such as a connector receptacle. Electrical circuit 730 may be connected to an electrical connector 740 through multiple connector pins. Electrical circuit 730 may include electronic components installed on a flexible print circuit board that can be bent to fit in openings or spaces in insert portion 710 or a large cover portion of the external device, such as first cover portion 210 of FIGS. 2A-2C. Electrical circuit 730, insert portion 710, and small cover portion 720 may form a removable assembly that can be attached to or detached from the large cover portion of the external device.

Figure 7B:
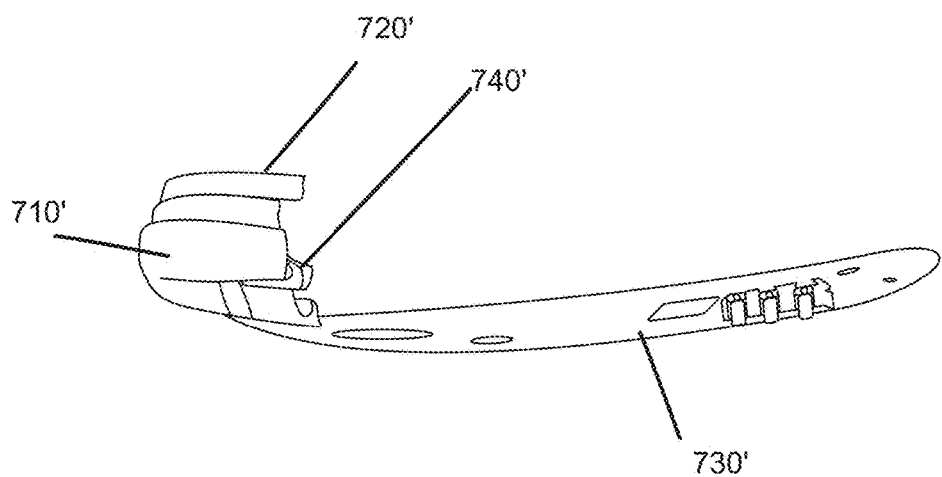
FIG. 7B depicts an example insert portion of an external device where the insert portion is coupled with an electrical circuit, according to certain aspects of the present disclosure.

FIG. 7B depicts an example insert portion 710' of an external device where insert portion 710' is coupled with an electrical circuit 730', according to certain aspects of the present disclosure. The top surface and at least some parts of side edges of insert portion 710' may be covered by a small cover portion 720', which may be made with any suitable natural or artificial materials, such as genuine leather, fabric, silk, faux leather, artificial leather, PVC, or vinyl.

Electrical circuit 730' may be connected to an electrical connector 740' through multiple connector pins. Insert portion 710', small cover portion 720', electrical circuit 730', and electrical connector 740' may correspond to insert portion 710, small cover portion 720, electrical circuit 730, and electrical connector 740 of FIG. 7A, respectively.

FIG. 8A is a front view of an example insert portion (covered by a small cover portion 820) of an external device where the insert portion is coupled with an electrical circuit 830, according to certain aspects of the present disclosure. Electrical circuit 830 may be connected to an electrical connector 840 through multiple connector pins. Structures and functions of the insert portion, small cover portion 820, electrical circuit 830, and electrical connector 840 may be similar to insert portion 710, small cover portion 720, electrical circuit 730, and electrical connector 740 of FIG. 7A, respectively.

FIG. 8B depicts an example insert portion 810' of an external device where insert portion 810' is coupled with an electrical circuit 830', according to certain aspects of the present disclosure. Electrical circuit 830' may be connected to an electrical connector 840' through multiple connector pins. Insert portion 810', small cover portion 820', electrical circuit 830', and electrical connector 840' may correspond to insert portion 810, small cover portion 820, electrical circuit 830, and electrical connector 840 of FIG. 8A, respectively.

Figure 9B:
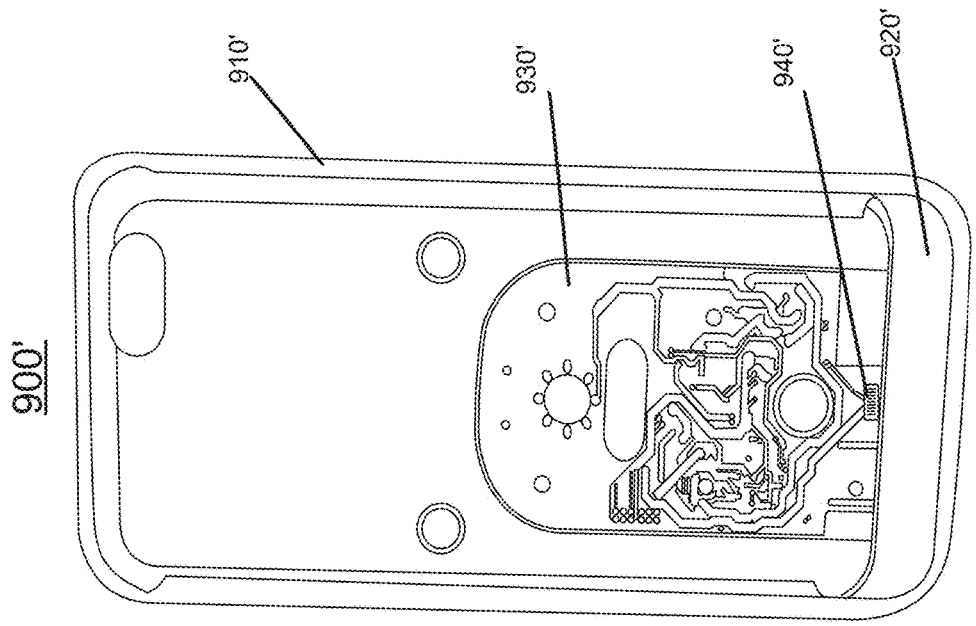
FIG. 9B depicts an assembled external device in the form of a mobile device case, according to certain aspects of the present disclosure.
Figure 9A:
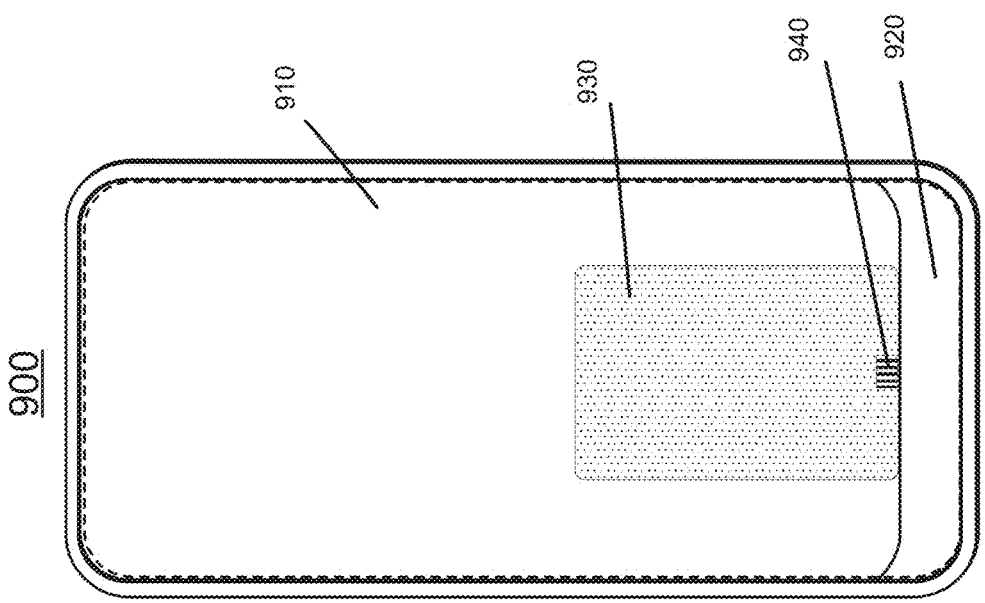
FIG. 9A is a front view of an assembled external device in the form of a mobile device case, according to certain aspects of the present disclosure.

FIG. 9A is a front view of an example assembled external device 900 in the form of a mobile device case, according to certain aspects of the present disclosure. As shown in FIG. 9A, an assembly as described above with respect to FIGS. 6A, 7A, and 8A, which may include a small cover portion 920, an insert (not shown) positioned under small cover portion 920, and an electrical circuit 930 (which may include or be connected to a connector 940), may be inserted and secured in a large cover portion 910 to form external device 900. Even though not shown in FIG. 9A, large cover portion 910 may include additional electrical circuits, such as batteries, memory devices, near-field communication (NFC) components, sensors, or antennas, that are electrically connected to electrical circuit 930. The additional electrical circuits of large cover portion 910 may be in electrical communication with electrical circuit 930 and the mobile device through, for example, various connectors on electrical circuit 930.

FIG. 9B depicts an example assembled external device 900' in the form of a mobile device case, according to certain aspects of the present disclosure. External device 900' is a specific example of external device 900, and may include an insert (not shown) positioned under a small cover portion 920' and an electrical circuit 930' (which may include or be connected to a connector 940'), as described above with respect to external device 900 of FIG. 9A.

In various embodiments, an overlay cover layer for the external device, which may include two or more portions as described above, may be made with any suitable natural or artificial materials, such as genuine leather, fabric, silk, faux leather, artificial leather, PVC, or vinyl, that may not be suitable for molding or 3-D printing.

Figure 10:
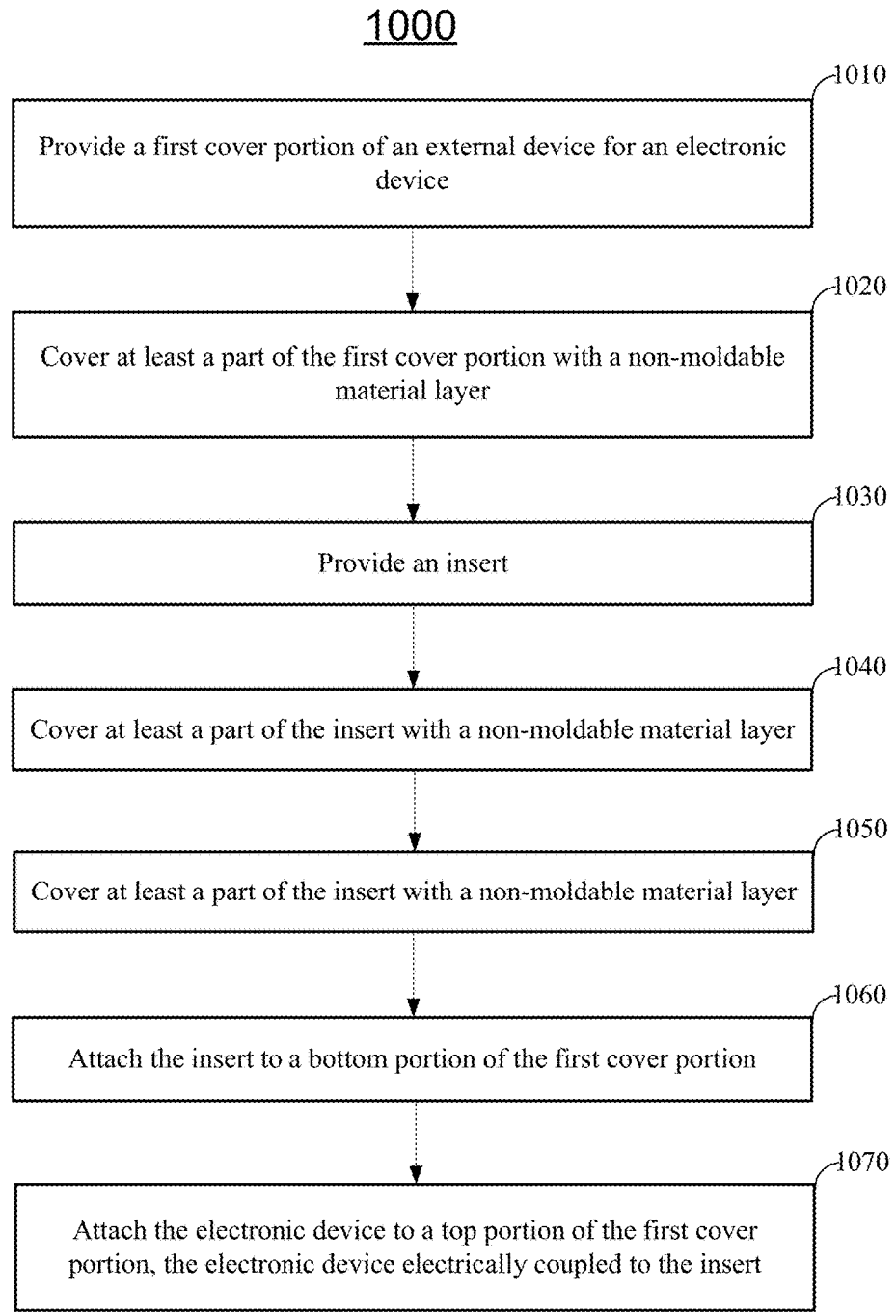
FIG. 10 is a simplified flow chart illustrating an example flow for making and using an external device for an electronic device, according to certain aspects of the present disclosure.

FIG. 10 is a simplified flow chart illustrating an example flow for making and using an external device for an electronic device, according to certain aspects of the present disclosure. It is noted that although FIG. 10 describes the operations in the example flow as a sequential process, some of the operations may be performed in parallel or concurrently. In addition, the order of the operations may be rearranged. An operation may have additional steps not included in the figure. Some operations may be optional, and thus may be omitted in various embodiments. Some operations described in one block may be performed together with operations at another block.

At block 1010, a first cover portion of an external device for an electronic device may be provided. The electronic device may be a mobile device, such as a cellular phone, and the external device may be in the form of a mobile device case. The first cover portion may be used to cover at least a portion of the back and four side edges of the mobile device, as described above with respect to first cover portion 210 of FIGS. 2A-2C. The first cover portion may be made with, for example, elastomeric/rubber materials, plastic materials, or combinations thereof, using, for example, 3-D printing or molding processes.

At block 1020, at least a part of the first cover portion may be covered with a non-moldable material layer. For example, the non-moldable material layer may cover an outer surface of the first cover portion and form a part of the first cover portion. The non-moldable material layer may be made with, for example, any suitable natural or artificial material, such as genuine leather, fabric, silk, faux leather, artificial leather, PVC, or vinyl, for example, by cutting and sewing the natural or artificial material. The non-moldable material layer may be attached to the first cover portion by, for example, an adhesive material, such as a glue.

At block 1030, an insert, such as insert portion 310 of FIG. 3A and 3B, insert 420 of FIG. 4A, insert 420' of FIG. 4B, insert portion 610 of FIG. 6A, insert portion 610' of FIG. 6B, insert portion 710 of FIG. 7A, and insert portion 710' of FIG. 7B, may be provided. As the first cover portion, the insert may be made with, for example, elastomeric/rubber materials, plastic materials, or combinations thereof, using, for example, 3-D printing or molding processes. As described above, the insert may include various mechanical structures formed thereon.

At block 1040, at least a part of the insert may be covered with a non-moldable material layer. For example, the non-moldable material layer may cover an outer surface of the insert and form a part of the insert, as shown in, for example, FIGS. 3C, 6B, 7B, and 8B. The non-moldable material layer may be made with, for example, any suitable natural or artificial material, such as genuine leather, fabric, silk, faux leather, artificial leather, PVC, or vinyl, for example, by cutting and sewing the natural or artificial material. The non-moldable material layer may be attached to the insert by, for example, a mechanical force or an adhesive material, such as a glue, as described above. The non-moldable material layer may be same as or different from the non-moldable material layer covering the first cover portion.

Optionally, at block 1050, an electrical circuit, such as electrical circuit 630 of FIG. 6A, electrical circuit 730 of FIG. 7A, electrical circuit 830 of FIG. 8A, or electrical circuit 930 of FIG. 9A, may be attached to the insert. The electrical circuit may be connected to or include one or more connectors or adaptors for connecting to various electronic components, such as a mobile device, a memory device, or a battery.

At block 1060, the insert, including the attached non-moldable material layer and/or electrical circuit, may be attached to and held by a bottom portion of the first cover portion using suitable means, such as chemical forces or mechanical forces, for example, friction forces, a clip, a latch, a pressure component, a deformable component, or the like.

Optionally, at block 1070, the electronic device may be attached to a top portion of the first cover portion and may be at least partially covered and protected by the first cover portion. When attached to the first cover portion, the electronic device may also be electrically coupled to the insert via, for example, a connector such as connector 740 of FIG. 7A, connector 840 of FIG. 8A, and connector 940 of FIG. 9A described above. The electronic device, when inserted, may help to hold the insert in the first cover portion.

Although shown and described in particular positions and of particular sizes and shapes, it is contemplated that the various elements described herein can be in a different position, can be of a different size, and can be of a different shape, while still maintaining the necessary configurations and connections for functioning as described herein. These are merely examples of alternatives that may be implemented; however, many other alternatives are available as appreciated by one skilled in the art.

It is also understood that the examples and embodiments described herein are for illustrative purposes only and that various modifications or changes in light thereof will be suggested to persons skilled in the art and are to be included within the spirit and purview of this application and scope of the appended claims, except as limited by the prior art.

What is claimed is:

1. An external device for an electronic device, comprising:
    a first cover portion configured to cover at least a portion of the electronic device, the first cover portion including a top wall, a bottom wall, two side walls, and a rear wall;
    an insert coupled to the first cover portion, wherein the insert includes a front surface and a rear surface, and wherein the rear surface of the insert is at least partially covered by the rear wall of the first cover portion; and
    a second cover portion coupled to the insert and covering at least a portion of the front surface of the insert,
    wherein at least one of an outer layer of the first cover portion or an outer layer of the second cover portion includes a non-moldable material.

2. The external device of claim 1, wherein the non-moldable material includes at least one of leather, fabric, silk, faux leather, artificial leather, or vinyl.

3. The external device of claim 1, wherein the insert and the second cover portion are disposed at a bottom portion of the first cover portion.

4. The external device of claim 1, wherein the insert includes a curved waveguide for conducting sound waves.

5. The external device of claim 4, wherein the curved waveguide is tapered from one end to another end.

6. The external device of claim 4, wherein the second cover portion includes a plurality of perforations aligned with one end of the curved waveguide.

7. The external device of claim 4, wherein the curved waveguide includes a 90-degree curve.

8. The external device of claim 4, wherein the curved waveguide includes a plurality of waveguides.

9. The external device of claim 1, wherein the insert includes one or more mechanical structures for housing one or more electrical connectors.

10. The external device of claim 1, further comprising an electrical circuit coupled to the insert.

11. The external device of claim 10, wherein the electrical circuit includes or is configured to connect to at least one of a connector, an adaptor, a memory device, or a battery.

12. The external device of claim 1, wherein the insert is detachably coupled to the first cover portion.

13. The external device of claim 1, wherein the insert includes a moldable material.

14. An assembly for use in an external case for an electronic device, the assembly comprising:
    an insert including a curved waveguide for conducting sound waves to the electronic device; and
    a cover covering at least a portion of the insert, wherein the cover includes one or more apertures aligned with one end of the curve waveguide on the insert.

15. The assembly of claim 14, wherein the cover includes a non-moldable material.

16. The assembly of claim 15, wherein the non-moldable material includes at least one of leather, fabric, silk, faux leather, artificial leather, or vinyl.

17. The assembly of claim 14, wherein the insert comprises one or more mechanical structures for housing one or more electrical connectors.

18. The assembly of claim 14, further comprising an electrical circuit coupled to the insert.

19. The assembly of claim 18, wherein the electrical circuit includes a flexible print circuit board.

20. The assembly of claim 14, wherein the insert is configured to be detachably coupled to the external case.

* * * * *